United States Patent Office 3,035,733
Patented May 22, 1962

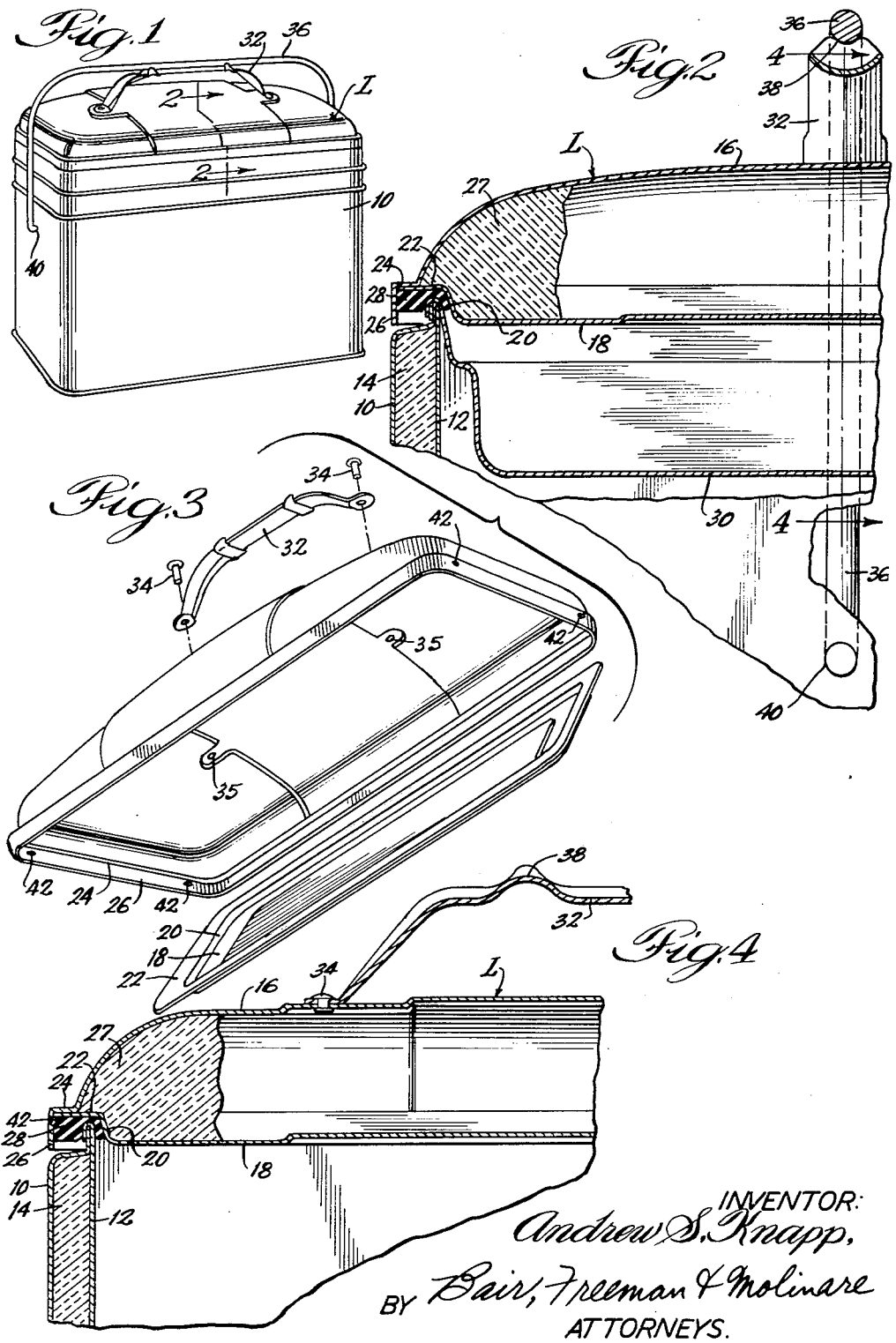
May 22, 1962 — A. S. KNAPP — 3,035,733
COOLER LID ASSEMBLY
Filed Aug. 17, 1959 — 2 Sheets-Sheet 1
INVENTOR:
Andrew S. Knapp,
BY Bair, Freeman & Molinare
ATTORNEYS.

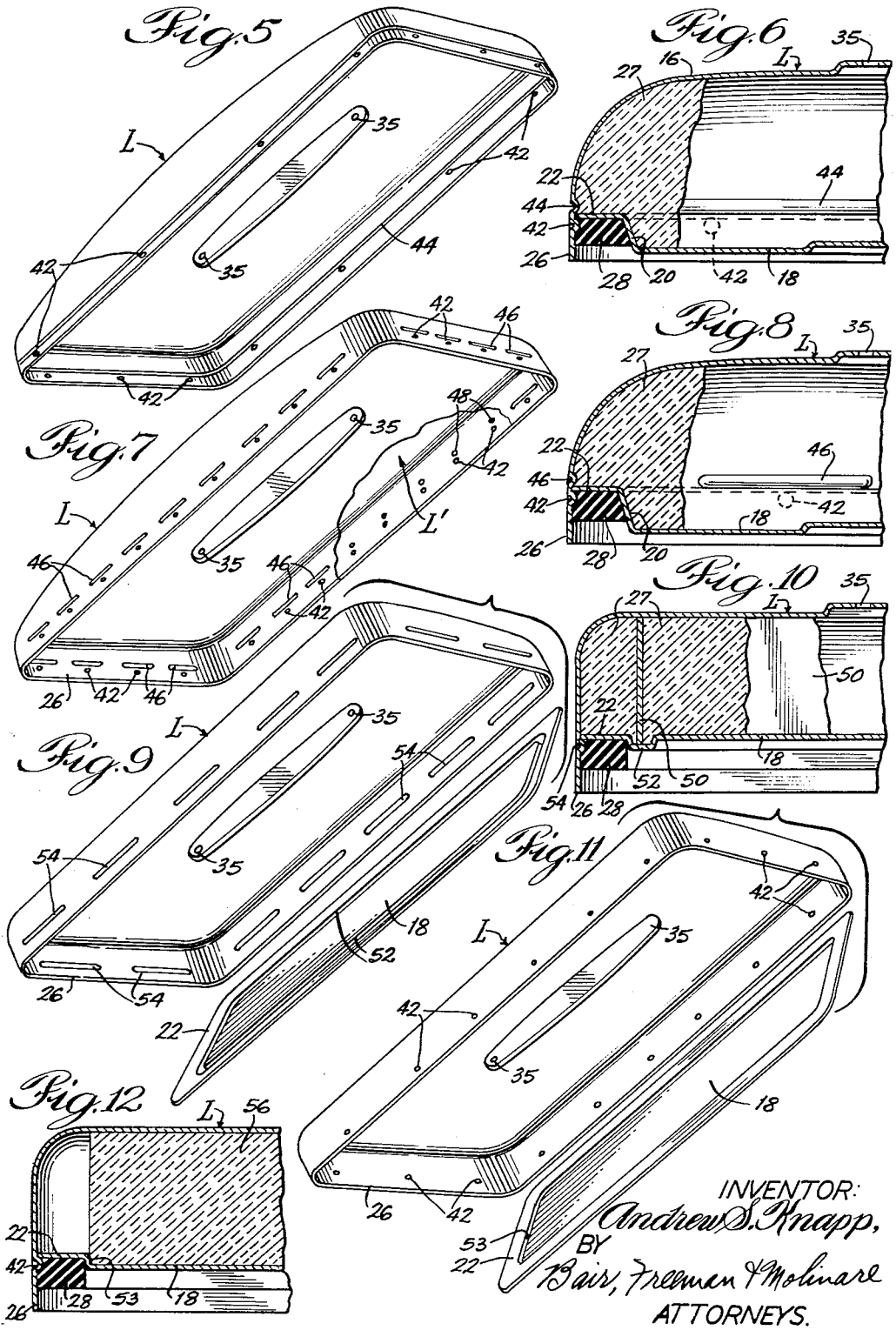

3,035,733
COOLER LID ASSEMBLY
Andrew S. Knapp, St. Louis, Mo., assignor to Knapp Monarch Company, St. Louis, Mo., a corporation of Delaware
Filed Aug. 17, 1959, Ser. No. 834,022
5 Claims. (Cl. 220—15)

This invention relates to a cooler lid assembly and particularly one in which the lid has a lid liner.

One object of the invention is to provide means to permit the lid liner to be snapped into position after the lid has been painted and a handle riveted thereto. In this connection cooler lids are usually made of sheet metal and painted, inside and out, to prevent rusting of the metal, whereas the lid liners are of galvanized steel, aluminum or plastic to prevent corrosion, paint being undesirable on the inside of the cooler where the metal could sweat and the paint peel off. It is therefore desirable to paint both the inside and the outside of the lid prior to assembly, and I provide a "snap-in" means to mount the liner in the lid, after suitable insulating material has been placed in the lid, and such material is thereupon held in position by the liner.

Another object is to provide the lid having means to limit the inward movement of the lid liner, such a shoulder, a bead, a series of spaced beads, a series of spaced dimples, or a spacer between the lid and the lid liner; combined with means to permit the edge of the lid to be snapped into position comprising projections such as indentations or "dimples" in the sheet metal of the lid, which may be either few or many in number and of such size that snap-in assembly is possible with assurance that the lid liner will thereafter remain in position and hold the insulation between the lid and its liner.

Still another object is to provide an assembly of lid and lid liner that permits the lid to be painted inside and out before a carrying handle is riveted thereto, thus simplifying the painting operation, with which handle a bail pivoted to the cooler may be associated in detent fashion to hold the lid in position on the cooler and a sealing gasket between the two compressed.

With these and other objects in view, my invention consists in the construction, arrangement and combination of the various parts of my cooler lid assembly, whereby the objects above contemplated are attained, as hereinafter more fully set forth, pointed out in my claims and illustrated in detail on the accompanying drawings, wherein.

FIG. 1 is a perspective view of a cooler, food chest or the like including a cooler lid assembly of the present invention;

FIG. 2 is an enlarged vertical sectional view thereof on the line 2—2 of FIG. 1;

FIG. 3 is an exploded perspective view of the lid, lid liner and carrying handle;

FIG. 4 is a vertical sectional view on the line 4—4 of FIG. 2;

FIG. 5 is a perspective view of a modification;

FIG. 6 is a sectional view similar to a portion of FIG. 4 showing the modification of FIG. 5;

FIG. 7 is a perspective view of another modification;

FIG. 8 is a sectional view similar to FIG. 6 showing the modification of FIG. 7;

FIG. 9 is a perspective view of still another modification;

FIG. 10 is a sectional view similar to FIG. 6 of the modification shown in FIG. 9;

FIG. 11 is a perspective view similar to FIG. 9 showing a further modification; and FIG. 12 is a sectional view similar to FIG. 6 showing the modification of FIG. 11.

On the accompanying drawings I have used the reference numeral 10 to indicate the body of the cooler comprising an outer sheet metal wall, 12 the body liner, and 14 insulating material such as Fiberglas. My present invention is particularly concerned with the lid L for the cooler 10 which will now be described in detail.

A sheet metal lid 16 of dished character as illustrated has therein a sheet metal or plastic lid liner 18. The liner has a shoulder 20 therearound for a gasket 28, and a peripheral flange 22 adapted to seat against a shoulder 24 of the lid 16. The shoulder 24 terminates in a downturned flange 26 to enclose the gasket 28. Insulating material 27 such as Fiberglas fills the space between the lid 16 and the lid liner 18.

The lid illustrated in FIGS. 1 to 4 includes a carrying handle 32 riveted to the lid by rivets as indicated at 34 which extend through apertures 35 in the lid, and a bail 36 is adapted to coact with an indent 38 thereof, the bail being pivoted to the cooler 10 at 40. Thus the bail and carrying handle cooperate to compress the gasket 28 and thereby seal the lid L to the cooler, as well as provide means for carrying the cooler which is comparatively heavy when packed with food and ice. The cooler may also have therein a food tray 30 to separate the food from the ice. I provide means whereby the lid liner 18 may be snapped into position with its flange 22 against the shoulder 24 after which it will be permanently retained in that position. To accomplish this I may provide snap-in dimples or indentations 42 in the sheet metal of the flange 26. A construction of this character is desirable from a number of standpoints:

(1) It makes it possible to rivet the carrying handle 32 to the lid 16 before assembly of the lid liner to the lid. If the handle were fastened to the lid before spray painting, a satisfactory paint job could not be accomplished, and if the handle were fastened to the lid after the lid liner were assembled, then screws would have to be used to hold the handle to the lid which would be more expensive and not as strong a construction because the thickness of the lid is not very great, being formed of sheet metal which is relatively thin.

(2) If the edge of the lid were crimped or rolled completely around the outer edge of the lid liner as in some types of coolers, then it would be more costly to paint the lid as it would have to be painted after the liner is in place, making necessary the masking of the bottom of the lid liner because it is in the area of the inside of the cooler where galvanized steel, aluminum or plastic is commonly used rather than painted parts to prevent corrosion and paint peeling.

(3) If the lid liner were originally fastened to the outer edge of the lid, the painting operation would be more expensive because the painter (the lids usually being spray painted) would have to fan the spray gun completely around the bottom turnover of the lid to insure that all of the lid area is painted and will not corrode.

(4) If the lid liner were fastened rigidly to the outer edge of the lid and the lid painted afterwards, no paint could be applied to the inner side of the lid 16 as the inner side is not accessible for paint; it would then be necessary to paint the inner side of the lid before assembly, or to use non-corrosive material, either of which would be expensive.

From the foregoing requirements it is obvious that the construction, shown in FIGS. 1 to 4 and described above, will accomplish the desired result of a snap-in assembly of lid liner relative to a cooler lid.

Instead of the shoulder 24, the lid 16 may be provided with a bead 44 completely therearound, indented into the sheet metal of the lid as shown in FIGS. 5 and 6. More of the indentations 42 are illustrated for supporting the lid liner and permitting it to be snapped into position with the bead 44 acting as a limiting means instead of the shoulder 24 and only four indentations 42 in FIG. 2.

Alternatively, the bead 44 may be broken into a series of intermittent beads as shown in FIGS. 7 and 8, or may consist of mere dimple-like indentations 48 as shown in the portion L' of FIG. 7 which portion illustrates a further modification.

In FIGS. 9 and 10, in place of the shoulder 24, the beads 44 and 46, or the indentations 48, a sheet metal spacer 50 formed of rectangular shape to fit in a similarly depressed groove 52 of the lid liner 18 may be provided as a limiting means for the inward location of the lid liner relative to the lid, and in place of the dimple-like indentations 42 heretofore described intermittent bead-like indentations 54 may be used as illustrated in FIG. 9. In FIGS. 11 and 12 on the other hand, I illustrate a modification in which block-like insulating material 56 such as plastic foam is provided and centered by a peripheral shoulder 53 on lid liner 18, instead of using the metal of FIG. 10, or some other low-price material, such as a spacer made of honeycombed cardboard may be used.

From the foregoing disclosure it will be obvious that I have provided a lid liner that can be readily snapped into position, thus permitting pre-painting of the inside and outside of the lid in the most economical manner, and snap-in assembly that requires a minimum of time and expense after the lid is painted. Likewise, the separate carrying handle 32 may be assembled to the lid after the lid is painted and before the lid liner is assembled in position, thus effecting a number of economies in manufacture making the cost of production less than prior types of constructions for coolers and their lid assemblies. While I have shown insulation between the lid and its liner, the insulation may be omitted as an air space furnishes some insulation and the lid and liner construction disclosed is as adaptable for air space insulation as it is for block or other insulation.

Some changes may be made in the construction and arrangement of the parts of my cooler lid assembly without departing from the real spirit and purpose of my invention, and it is my intention to cover by my claims any modified forms of structure or use of mechanical equivalents which may reasonably be included within their scope.

I claim as my invention:

1. In a cooler lid assembly, a sheet metal lid having a depending peripheral wall, a lid liner therein, a spacing strip disposed edgewise between said lid and said lid liner and spaced inwardly of both the peripheral wall of the lid and of the peripheral edge of the lid liner, said spacing strip operating to limit the entry of said lid liner into said lid, and a plurality of spaced indentations in the outer surface of said lid providing inwardly extending protuberances under the edge of said lid liner to retain the latter within said lid.

2. In a cooler lid assembly, a sheet metal lid having a depending peripheral wall, a lid liner, insulating material in pre-shaped block form positioned between the lid and lid liner and spaced inwardly of both the peripheral wall of the lid and of the peripheral edge of the lid liner, said pre-shaped block of insulating material operating to limit the entry of said lid liner into said lid, and a plurality of spaced indentations in said lid and extending toward the center thereof under the edge of said lid liner to retain it in said lid.

3. A cooler lid assembly comprising, in combination: a dished sheet metal lid defining a transverse side and a continuous peripheral flange; a panel-like, shape-sustaining lid liner formed from a sheet of relatively rigid and shape-sustaining material and having a peripheral edge contour that is substantially the same as the interior contour of said continuous peripheral flange to permit of sliding entry of said lid liner within said peripheral flange; insulation means between the lid and lid liner; and assembly means for engaging the peripheral edge of said shape-sustaining lid liner for effecting snap-in assembly of said lid liner in said lid, said assembly means including shoulder means defined on said peripheral flange and located in a first plane transverse to said peripheral flange and spaced from said transverse side, and against which shoulder means the lid liner is adapted to abut to limit entry of the lid liner into said lid, and a plurality of spaced retainer indentations defined on said peripheral flange and located in a second plane that is transverse to said peripheral flange and is spaced from said transverse side a greater distance than the spacing of said shoulder means from said transverse side, and past which retainer indentations the peripheral edge of said shape-sustaining lid liner is adapted to be forced so that said retainer indentations project inwardly from the peripheral flange to positions under the edges of said lid liner to retain said lid liner within said lid.

4. A cooler lid assembly comprising, in combination: a dished sheet metal lid defining a transverse side and a continuous peripheral flange; a panel-like, shape-sustaining lid liner formed from a sheet of relatively rigid and shape-sustaining material and having a peripheral edge contour that is substantially the same as the interior contour of said continuous peripheral flange to permit of sliding entry of said lid liner within said peripheral flange; insulation means between the lid and lid liner; and assembly means for engaging the peripheral edge of said shape-sustaining lid liner for effecting snap-in assembly of said lid liner in said lid, said assembly means including abutment indentations defined on said peripheral flange and extending inwardly from said flange, said abutment indentations being located in a first plane transverse to said peripheral flange and spaced from said transverse side and against which abutment indentations the lid liner is adapted to abut to limit entry of the lid liner into said lid, and a plurality of spaced retainer indentations defined on said peripheral flange and located directly opposite to portions of said abutment indentations, said retainer indentations being located in a second plane that is transverse to said peripheral flange and is spaced from said transverse side a greater distance than the spacing of said abutment indentations from said transverse side, and past which retainer indentations the peripheral edge of said shape-sustaining lid liner is adapted to be forced so that said retainer indentations project inwardly from the peripheral flange to positions under the edges of said lid liner to retain said lid liner within said lid.

5. A cooler lid assembly comprising, in combination: a dished sheet metal lid defining a transverse side and a continuous peripheral flange; a panel-like, shape-sustaining lid liner formed from a sheet of relatively rigid and shape-sustaining material and having a peripheral edge contour that is substantially the same as the interior contour of said continuous peripheral flange to permit of sliding entry of said lid liner within said peripheral flange; and assembly means for engaging the peripheral edge of said shape-sustaining lid liner for effecting snap-in assembly of said lid liner in said lid, said assembly means including a spacer separate from the lid and lid liner and spaced laterally inwardly of the peripheral flang on the lid and located between said lid and said lid liner to limit entry of said lid liner into said lid, and a plurality of spaced indentations defined on said peripheral flange and past which the peripheral edge of said shape-sustaining lid liner is to be forced, said indentations projecting inwardly from the peripheral flanges to extend under the edges of said lid liner to retain said lid liner against said spacer.

(References on following page)

References Cited in the file of this patent

UNITED STATES PATENTS

| | | | |
|---|---|---|---|
| 900,678 | Mohr | Oct. 6, | 1908 |
| 913,337 | Wiffin | Feb. 23, | 1909 |
| 1,157,041 | Reynolds | Oct. 19, | 1915 |
| 1,252,494 | Pratt | Jan. 8, | 1918 |
| 1,345,379 | McArthur | July 6, | 1920 |
| 2,055,339 | Dalton | Sept. 22, | 1936 |
| 2,504,390 | Caldwell | Apr. 18, | 1950 |
| 2,543,839 | Faris | Mar. 6, | 1951 |
| 2,904,837 | Crabbe | Sept. 22, | 1959 |